Figure 1:
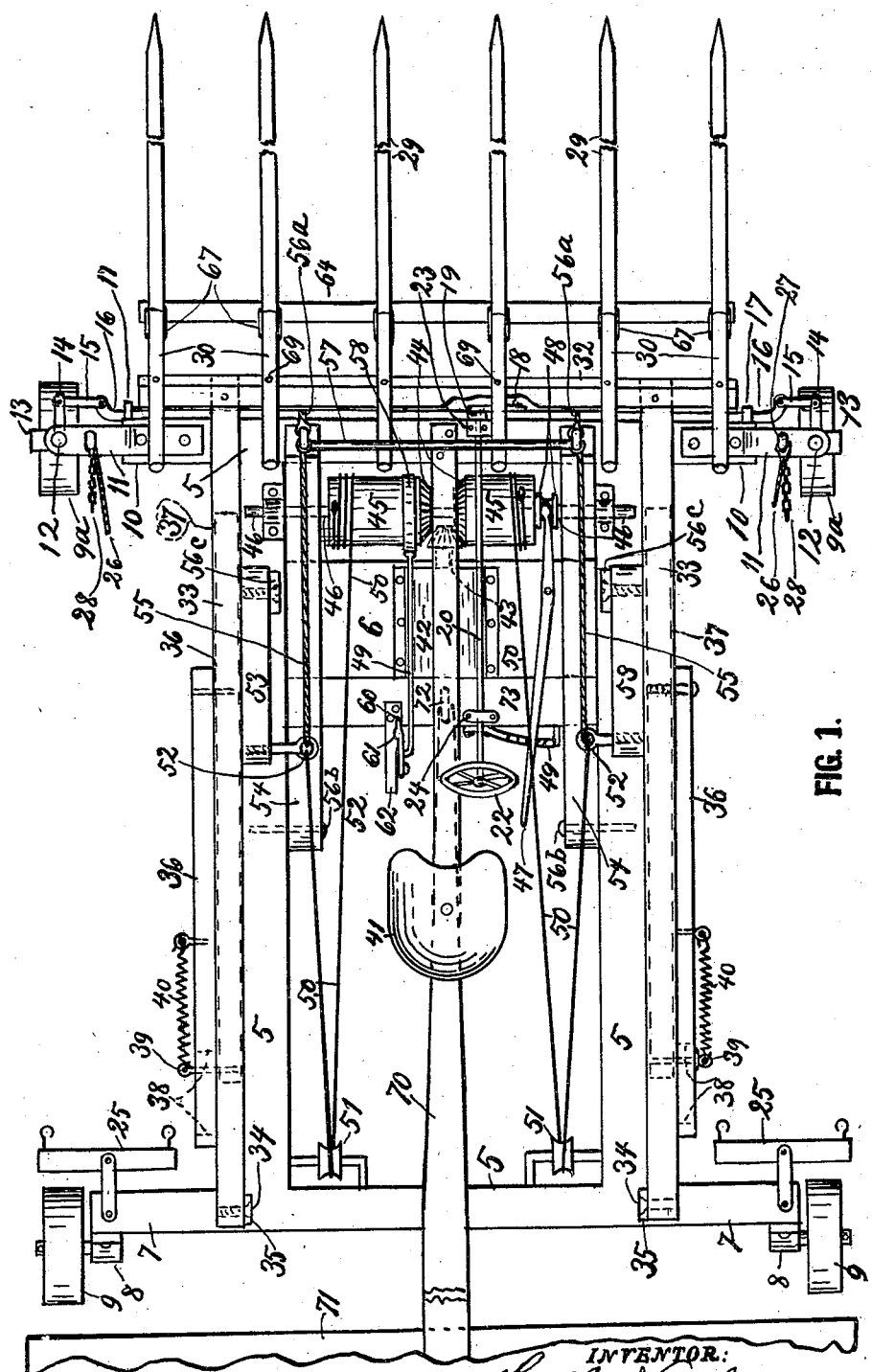

C. J. NORDLUM.
WAGON LOADING MACHINE.
APPLICATION FILED MAY 15, 1920.

1,409,399.

Patented Mar. 14, 1922.
2 SHEETS—SHEET 1.

INVENTOR:
Carl J. Nordlum
BY his ATTORNEY:
A. M. Carlsen

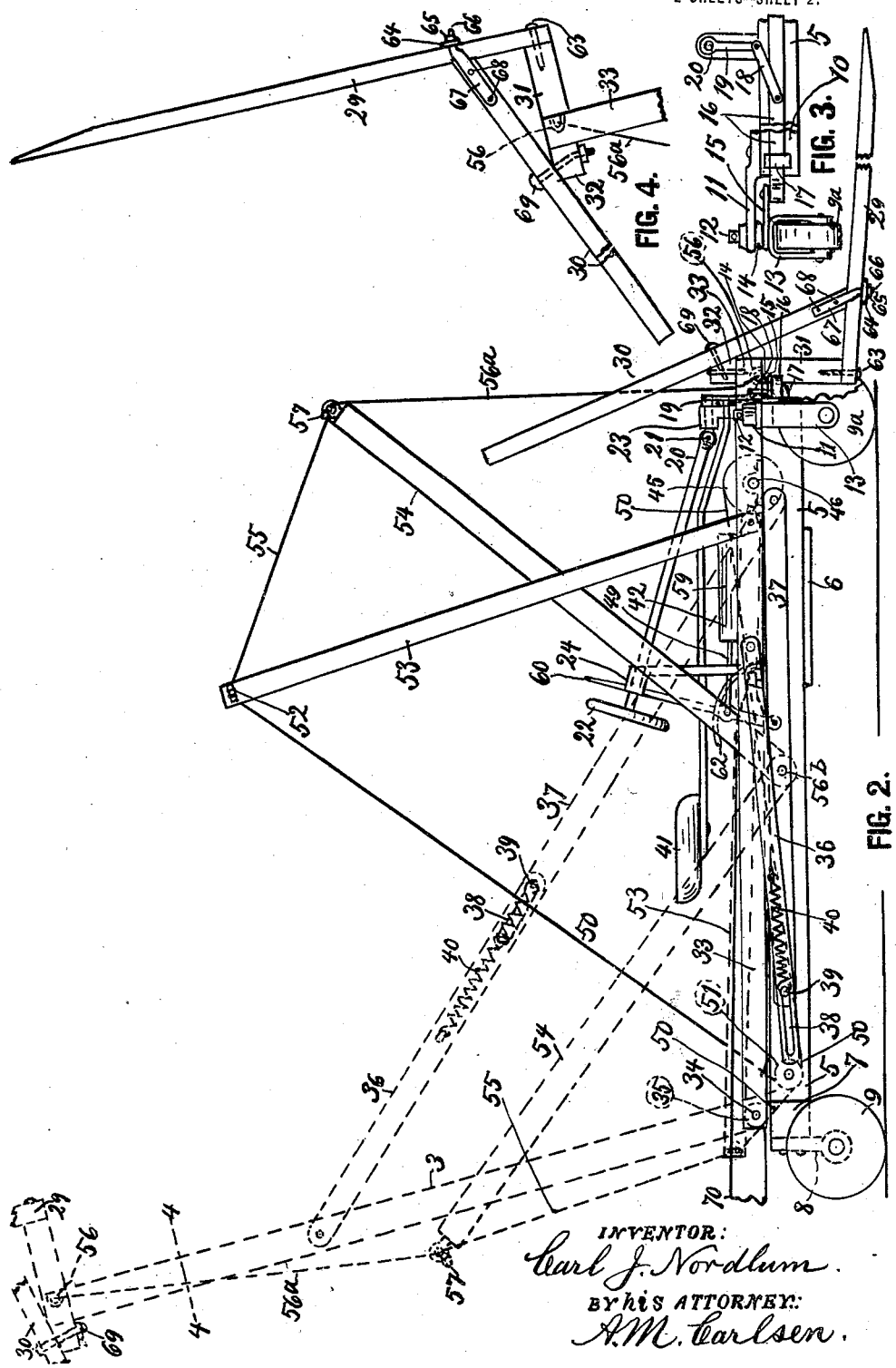

UNITED STATES PATENT OFFICE.

CARL J. NORDLUM, OF MINNEAPOLIS, MINNESOTA.

WAGON-LOADING MACHINE.

1,409,399. Specification of Letters Patent. Patented Mar. 14, 1922.

Application filed May 15, 1920. Serial No. 381,587.

*To all whom it may concern:*

Be it known that I, CARL J. NORDLUM, a citizen of the United States, residing at Minneapolis, in the county of Hennepin and State of Minnesota, have invented a new and useful Wagon-Loading Machine, of which the following is a specification.

This invention relates to wagon loading machines, and the object is to provide an improved, cheap and convenient machine for loading hay, straw, grain shocks and other stuff into a wagon or a hay rack attached to the machine. The machine is preferably drawn by horses or other animals but the loading mechanism is operated by an explosive engine, mounted on the machine, so as to avoid the old time-wasting process of changing horses from the position in which they draw the machine and hitching them to a horse-power device for elevating and loading the hay, and then transferring them back again to the first position every time the machine is to be moved forward.

In the accompanying drawing:

Fig. 1 is a top plan view of the improved machine with a fragment of a hay rack or wagon attached to it. Fig. 2 is a side elevation of Fig. 1 with a few parts omitted. Fig. 3 is a fragmentary front elevation of the adjacent corner of Fig. 2 with the rake omitted. Fig. 4 is a side elevation showing more fully the part of the machine above line 4—4 in Fig. 2.

Referring to the drawing by reference numerals, 5 designates the main frame of the machine, it is flat and partly skeletoned, with a platform 6, which may be of any desired size. The rear corners of the frame have laterally extending arms 7, with metal brackets 8, to which supporting wheels 9 are journaled. The front corners have similar arms 10 with brackets 11, in each of which is journaled the vertical stem 12 of a fork 13, having a rocker arm 14 connected by a link 15 to one end of a transverse rod 16, which is slidable in guides 17 on the main frame, and has its middle portion connected by a link 18 to a crank or rocker arm 19 fixed on a steering shaft 20; which shaft may have a universal joint 21 (see Fig. 2) and is provided with a steering hand-wheel 22. Said shaft is journaled in suitable bearings 23, 24, fixed on the frame, and the forks 13 are provided with supporting wheels 9ª.

Attached to the rear frame arms 7 are single-trees 25 to which may be hitched two horses, one at each side of the machine. Each horse to have a leader line 26 connecting its bit to a fastening means 27 on the front arm 10—11, and a hold-back strap 28 extending also to said fastening means.

The fork-shaped rake by which the hay is picked up and loaded into the wagon consists of a series of tines 29, guard bars 30 and transverse bars 31 and 32. Between the latter two bars are secured the front ends of two long bars 33, whose rear ends are pivoted at 34 to brackets 35 fixed on the frame. Each bar 33 is connected to the main frame, by a foldable brace composed of two partly overlapped sections, 36, 37. The overlapping end of each brace section 36 is provided with a longitudinal slot 38, in which the pivot 39 of the joint is movable but is fixed in the section 37, and is by a pulling coil spring 40 connected to the section 36. The service of said spring is to swing the rake arms 33 forward of a vertical position as soon as the hay has slid off from the guard bars 30 into the wagon, which action takes place when the rake is in the inclined position shown in Fig. 4 and in dotted lines in Fig. 2, and thus enable the rake to be lowered by its weight under control of a brake or the reversed hoisting means, which will now be described.

In the front part of the frame, forward of a seat 41, is mounted an explosive engine 42, whose shaft carries a bevel pinion 43 (see Fig. 1) which may be engaged by either one of two bevel gears 44, each of which is fixed on a rope drum 45, secured on a slidable shaft 46, or they may be secured together and be slidable on the shaft. In either case a single shifter lever 47, engaged between collars 48 and having its handle end engageable with a notched segment 49, will hold the gears either idle or one of them engaged with the pinion so as to rotate the two drums in one direction for hoisting and in an other direction for lowering the rake, as will appear from the fact that on each drum or drum section 45 is fixed and partly wound one end of a cable 50, which is guided over a sheave 51 and has its other end secured at 52 to the upper end of a boom 53 which crosses loosely another boom 54, to which it is connected by a cable or other brace 55, and the top end of each boom 54 is connected at 56 to the rake head 31 by a cable 56ª. All the booms are pivoted with their lower ends to the main frame as at 56ᵇ, or to brackets 56ᶜ on same, so as to swing back and forth; and the two bars 54 are connected at the top by a cross brace 57.

A brake band 58 on one of the rope drums 45 serves to control both drums. Said band is connected by a rod 59 to a brake lever 60, which is normally held idle in a notch 61 of a bracket 62.

To describe more exactly the preferable structure of the rake or fork, the tines have their rear ends secured to the lower part of the rake head by screws or similar means 63; and forward thereof the tines are secured together by a cross bar 64, which bar is preferably of flat bar iron and drawn tight up under the tines by nuts 65, threaded upon the lower ends 66 of cheek pieces 67 secured by rivets 68 to the sides of the adjacent ends of the guard bars 30. The latter bars are also firmly secured to the bar 32 of the rake head by either screws or bolts 69.

70 designates the pole or tongue of a hay rake or other wagon 71. It is pivotally and detachably connected or hitched at 72 to the cross bar 73 of the main frame.

In the operation of the machine, when grain shocks, hay cocks or hay in windrows is to be loaded into a wagon, the horses are unhitched from the wagon and hitched to the draft appliance 25, which may have been detached from the wagon or otherwise provided; the wagon is then attached with its pole so it will be drawn close behind the machine. The horses now draw the machine and the wagon forward with the rake lowered until it has gathered its load, the horses may then rest, or proceed toward another hay cock or grain shock while the engine 42 raises the loaded rake until it tilts backward far enough to discharge its burden into the wagon. The springs 40 now throws the rake forward again past a vertical position and it falls to the ground at such speed as the operator allows either by the brake 58 and lever 60, or by throwing the other gear 44 into mesh with the pinion 43, and letting the engine lower the rake with or without the assistance of the brake.

When the wagon is loaded the horses are hitched to it and haul it to the place where it is unloaded. This operation may be repeated as long as desired or required.

What I claim is:

1. A wagon loading machine comprising a wheel-supported main frame, a push rake arranged to be lowered to the ground in the front of the frame and having arms pivoted with their rear ends upon the rear end of the frame, power operated winding drums mounted on the frame, means for reversing the drums and operative connection between the drums and the rake for raising it from the ground and swinging it upward and rearward until its inclined position causes the discharging of its contents rearward of the machine; said operative connection comprising a pair of upstanding parallel spaced inner booms having their upper ends connected together by a transverse horizontal brace and their lower ends pivoted to the frame so as to make the booms swingable back and forth in longitudinal direction of the frame, a pair of outer booms likewise pivoted with the lower ends to the frame some distance forward of the inner booms and crossing the latter when the rake is near the ground, cables connecting the rake with the tops of the inner booms, cables connecting the tops of the inner booms with the tops of the outer booms, cables extending from the tops of the outer booms to the drums, and guiding means upon the rear end of the frame for the last mentioned cables.

2. The structure specified in claim 1, and means for positively stopping the rake when inclined rearwardly to its predetermined position, and automatic means for swinging the emptied rake from a rearwardly to a forwardly inclined position.

In testimony whereof I affix my signature.

CARL J. NORDLUM.